United States Patent [19]

Frank

[11] 4,249,782
[45] Feb. 10, 1981

[54] SELF-ALIGNING BEARING AND SEAL

[75] Inventor: William R. Frank, Moline, Ill.

[73] Assignee: Deere & Company, Moline, Ill.

[21] Appl. No.: 74,449

[22] Filed: Sep. 11, 1979

Related U.S. Application Data

[63] Continuation-in-part of Ser. No. 893,952, Apr. 6, 1978, abandoned.

[51] Int. Cl.³ .............................................. F16C 33/78
[52] U.S. Cl. ................................ 308/187; 308/187.1; 308/181; 308/19
[58] Field of Search ..................... 308/187, 187.1, 181, 308/19, 194, 29, 36.1, 72

[56] References Cited

U.S. PATENT DOCUMENTS

| | | | |
|---|---|---|---|
| 2,731,310 | 1/1956 | Potter ................................... | 308/187 |
| 2,733,648 | 2/1956 | Todd .................................... | 308/194 |
| 3,519,316 | 7/1970 | Göthberg .......................... | 308/187.1 |

FOREIGN PATENT DOCUMENTS 1241605 8/1971 United Kingdom ................. 308/187.2
1421630 1/1976 United Kingdom .

*Primary Examiner*—Lenard A. Footland

[57] ABSTRACT

A dynamically self-aligning bearing and seal for use with agricultural groundworking tools which are exposed to contaminated environments and severe shock loadings. The improved bearing utilizes a spherically-shaped support housing and spherically-shaped outer race ring that are slidably engaged to permit dynamic oscillating movement of the outer race ring relative to the support housing. A multi-lipped seal is carried by the outer race ring and includes first lips extending radially inwardly to wipingly seal the anti-friction ball bearings against contaminates. A thicker second lip of the seal extends radially towards the inner surface of the housing and acts to frictionally and yieldably resist rotating and oscillating movement of the outer race ring relative to the housing. The second lip further serves to seal against entry of contaminates between the two spherically-shaped and interacting surfaces.

35 Claims, 9 Drawing Figures

U.S. Patent  Feb. 10, 1981  Sheet 1 of 3  4,249,782
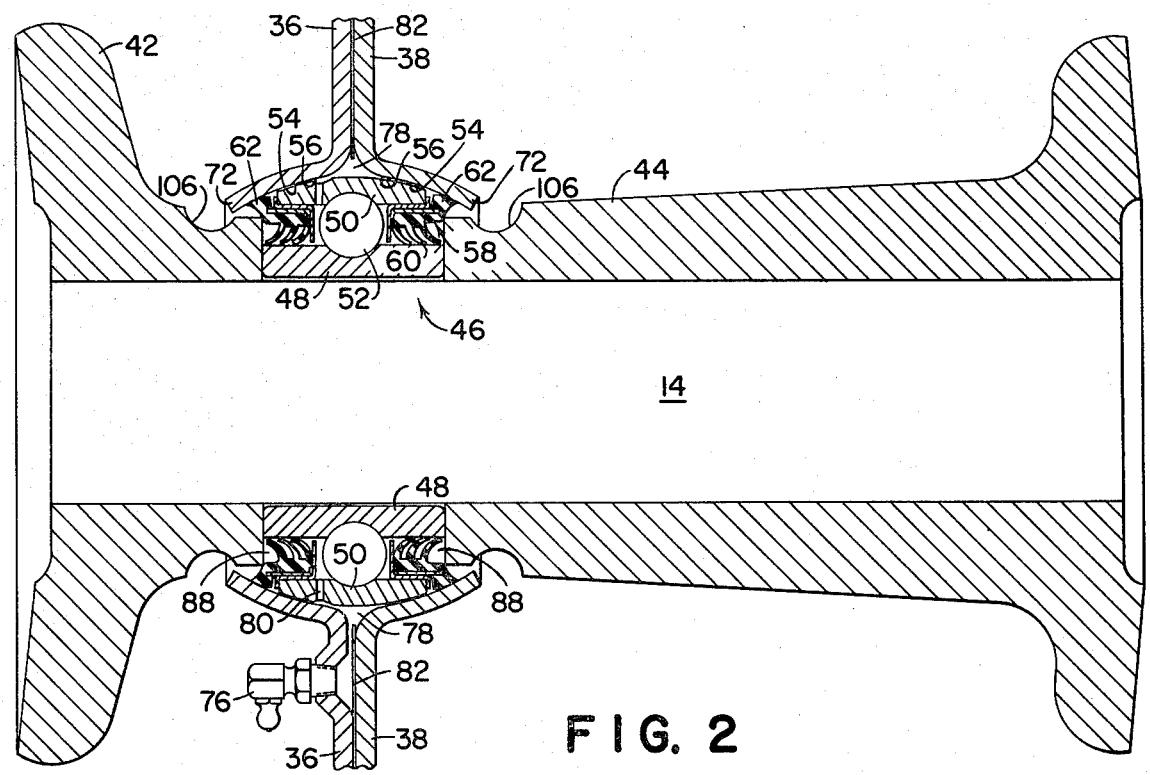
FIG. 2
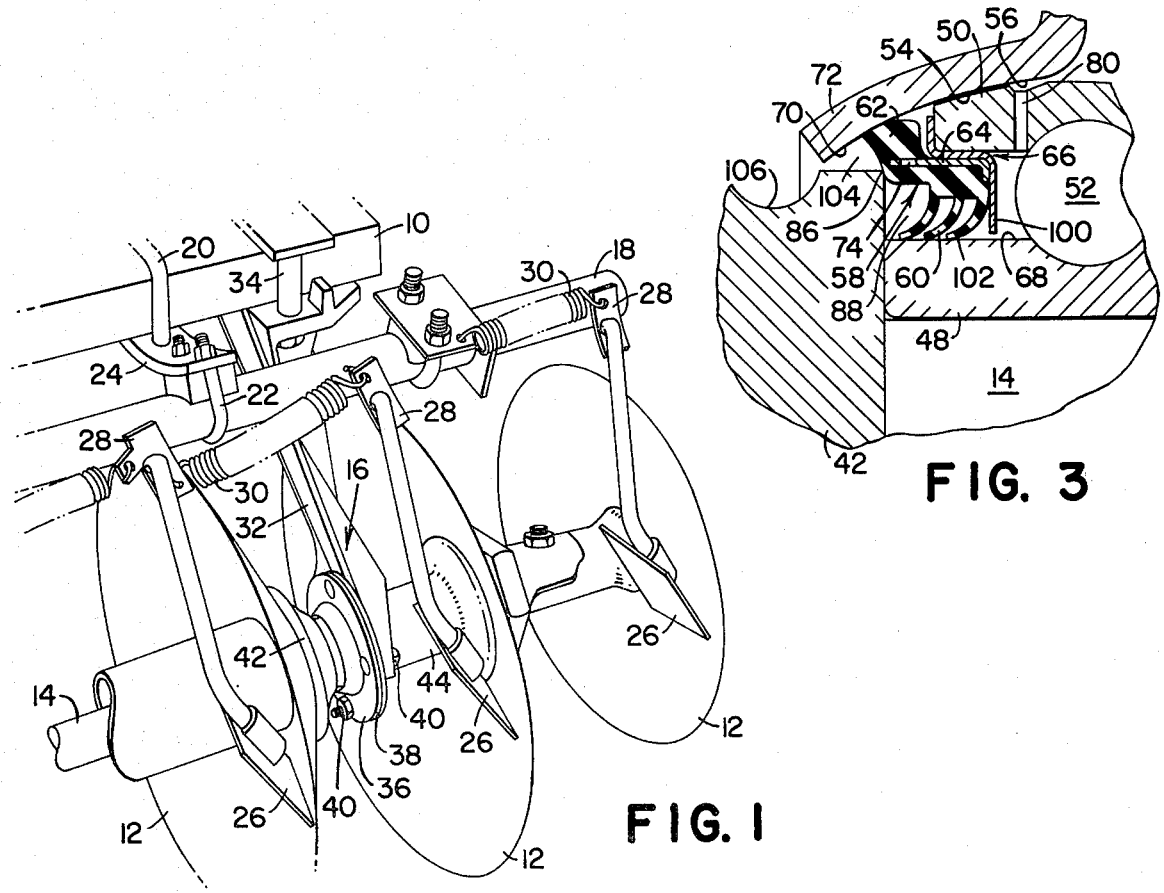
FIG. 3
FIG. 1

SELF-ALIGNING BEARING AND SEAL

This application is a continuation-in-part of U.S. application Ser. No. 893,952 filed on 6 Apr. 1978, now abandoned.

BACKGROUND OF THE INVENTION

The present invention relates generally to agricultural equipment and more particularly relates to a self-aligning bearing of the type utilized for supporting a shaft having earthworking tools, such as disk blades, mounted thereon.

Rotating earthworking tools such as disk harrow blades are typically supported for rotation with a shaft which in turn is carried by bearings mounted in a support member suspended from an implement frame. The bearings which rotatably support the shaft must be designed to assure that the shaft rotates freely after assembly and to also permit osciallation and dynamic self-alignment of the bearings within the support member during earthworking operations.

During assembly of the shaft, bearings and supports, some misalignment of the shaft or bearings within the support member can result. The bearings must be designed to permit self-alignment during such assembly or rapid failure will occur.

During earthworking operations, oscillation or rocking of the bearing outer race ring within the support can occur as a consequence of several factors. Generally, several supports carry bearings within which a shaft is mounted. The bearing supports are in turn carried by the implement frame. During such operations, various forces are encountered by tools such as disk blades as they work the varying soil conditions and contact objects and obstacles in the ground. These forces create axial as well as radial loadings upon the shaft and bearings and require that the bearings be able to oscillate or rock axially within the support but realign subsequent to exposure to the forces. Further the frame from which the bearing supports are suspended is subjected to vertical and horizontal loadings thereby transferring to the bearing supports axial and radial forces and further requiring that the bearings be designed to absorb axial loadings and be able to shift or oscillate slightly during exposure to the forces.

In U.S. Pat. No. 2,733,648 to E. W. Todd, there is provided a bearing and support that permits misalignment of the support relative to the bearings during assembly. Such misalignment is tolerated through the use of spherically-formed surfaces between the housing support and the outer race rings which can be assembled with the housing support secured in a position skewed from directly perpendicular to the shaft supported by the bearings.

To permit realignment of the bearings within the support after assembly and during exposure to operating forces, metal supports have been designed to encase or shroud the bearings and seals. An example of such a support can be found in U.S. Pat. No. 3,311,429 to Kocian. This encasing support, however, severely limits the degree of oscillation or wobble of the bearing within the support and thus restricts the ability of the bearing to absorb the operating forces discussed above. Further, contaminates can enter this type of encasement and pack the bearings to more severely restrict oscillation capabilities.

In an attempt to provide a bearing support that permits a greater degree of oscillation or wobble during operation, Fafnir and some other bearing manufacturers have provided bearings with lubriciated spherically-formed surfaces between the housing support and outer race ring. See, for example, the Fafnir bearing, Model GVFD, GVFDR Relubricatable Series. These bearings, however, are capable of only limited dynamic realignment since the outer race ring outer surface is sized for an interference fit with the support member and thus can permit relative movement between the two members only when subjected to significant operating forces. Such an interference fit has been necessary to date to prevent the frictional drag generated between the seal lips and inner race ring from rotating the outer race ring within the spherical housing. Further, since bearings used in earthworking operations are typically exposed to dirt, sand, water and other contaminates, severe damage can occur to the interacting metal parts unless they are maintained in a well-lubricated and sealed manner against entry of such contaminates. No such provision for sealing the interacting spherical surface of these bearings has been made.

In an attempt to prevent the entry of such contaminates into agricultural use bearings, overhanging flanges, such as those illustrated in Todd (U.S. Pat. No. 2,733,648), have been used. The flanges which form gaps with the bearing collars act only as deflectors and do not seal out contaminates. Consequently, as dirt accumulates adjacent to the bearing seal, the seal flexibility is soon lost and metal wear rapidly results causing premature bearing failure.

SUMMARY OF THE INVENTION

To overcome these problems, there is provided a sealed dynamically self-aligning bearing. Oscillating movement or wobble of the shaft and its bearing relative to the support is provided through the use of spherically-shaped complementary surfaces between the housing and outer race ring. A unique multi-lipped flexible seal prevents contaminants from entering between the spherically-shaped interacting metal surfaces and also prevents contamination from entering the anti-friction means. A modified embodiment also acts to prevent accumulation or packing of dirt adjacent to the seal lips.

To assure self-alignment during operation, the co-acting spherical surfaces of the housing and outer race ring are sized to be freely slidable against one another even after assembly. A reservoir of lubrication is provided between the housing and outer race ring to assure continued lubrication and the housing is formed to have side flanges projecting axially well beyond the radially extending faces of the outer race ring to reduce exposure to contaminates and increase the range of oscillation permitted. A multi-lipped resilient seal is carried by the outer race ring and includes first lips extending radially towards and wipingly engaging the inner race ring to seal the anti-friction ball bearings against contamination. To resist rotating movement of the outer race ring relative to the housing, the unique seal is provided with a second and thicker resilient lip which frictionally rubs against the spherical support surface of the housing. This lip flexibly acts to restrict rotating and oscillating movement of the outer race ring relative to the housing, yet permits such movement when the forces exceed certain threshold limits. Such oscillating movement has occurred in laboratory tests at $\frac{1}{8}$ to 1/9 of the realignment torque found necessary in commercially available spherical bearing and housing assemblies. A stiffening member extends radially along the radially extending face of the outer race ring and supports the second lip to assure sufficient frictional contact between it and the spherical housing surface. When assembled, the spherical surface of the housing compresses the second lip radially inwardly to further insure the desired frictional contact and restrict relative movement between the two spherically-shaped surfaces.

To prevent the entry of contamination into the antifriction ball bearings, several radially inwardly extending lip surfaces are provided to wipingly engage the outer circumferential surface of the inner race ring. The axially outermost of these lips is thicker than the others to better resist entry of contamination as it accumulates adjacent to the lips. The second or outwardly extending resilient seal lip can further be modified to engage the collar member adjacent the inner race ring and retard the accumulation of such contamination next to the wiper lips which seal the anti-friction means.

To assure a continued supply of lubrication to the interacting spherical metal surfaces and also the antifriction means, a lubrication reservoir and improved means for introducing lubrication into the bearing and between all interacting metal surfaces is further provided.

BRIEF DESCRIPTION OF THE DRAWINGS

FIG. 1 is a partial view of a disk harrow illustrating the bearing and its support in combination with the disk frame, shaft, and blades.

FIG. 2 is an enlarged and cut away side view of the bearing, bearing support and adjacent spacer collars.

FIG. 3 is a further enlarged and partial view of the bearing and its seal illustrated in FIG. 2.

DESCRIPTION OF THE PREFERRED EMBODIMENT

Figure 4:
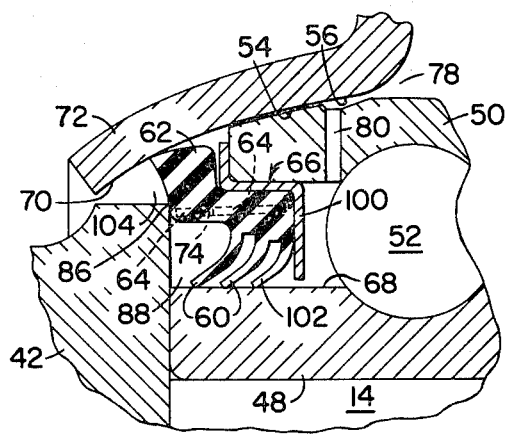
FIG. 4 is a view similar to FIG. 3 illustrating a seal construction utilizing a core.

Referring now to FIG. 1 of the drawings, there is shown a portion of a typical disk harrow including a disk frame 10 and disk blades 12 supported on a shaft 14 which is carried by a bearing support 16. The frame 10 further carries a scraper tube 18 connected thereto by U bolts 20, 22 and brackets 24. Self-adjusting scrapers 26 are pivotally carried by tension levers 28 supported on the scraper tube 18 and biased by tension springs 30 into contact with one surface of a respective disk blade. The bearing support 16 includes the structural arm 32 connected by bolts 34 with the frame 10 and the stamped or cast flange halves 36 and 38 coupled by bolts 40.

Looking now to FIG. 2 which illustrates in cross section the shaft 14, bearing 46 and adjacent spacer spools 42 and 44, it will be seen that the bearing 46 is carried within the stamped flange halves 36 and 38. The shaft 14 carries an inner bearing race ring 48 and an outer race ring 50 with a plurality of antifriction elements or ball bearings 52 therebetween. The flanges 36 and 38 have an inner bearing-receiving surface 56 shaped as the section of a sphere and the outer race ring outer surface 54 is formed to complement and be loosely and slidably received by the bearing receiving surface 56. In the preferred embodiment illustrated in FIG. 9, the spherical surfaces 54–56 are formed about a common center located in the shaft. To assure free sliding action (oscillation) of the outer race ring 50 in the support 16, the outer surface of the outer race ring is formed about a smaller radius than the radius of the inner surface of support housing 16.

Cast spacer spools 42 and 44 are provided on each side of the bearing in abutment with the sides of the inner race ring 48. The diameter of the portions of the spacer spools 42 and 44 adjacent the inner race ring 48 in the preferred embodiment exceeds the diameter of the outer surface of the inner race ring 48 so as to limit the portion of the seal 58 exposed to contamination.

Figure 9:
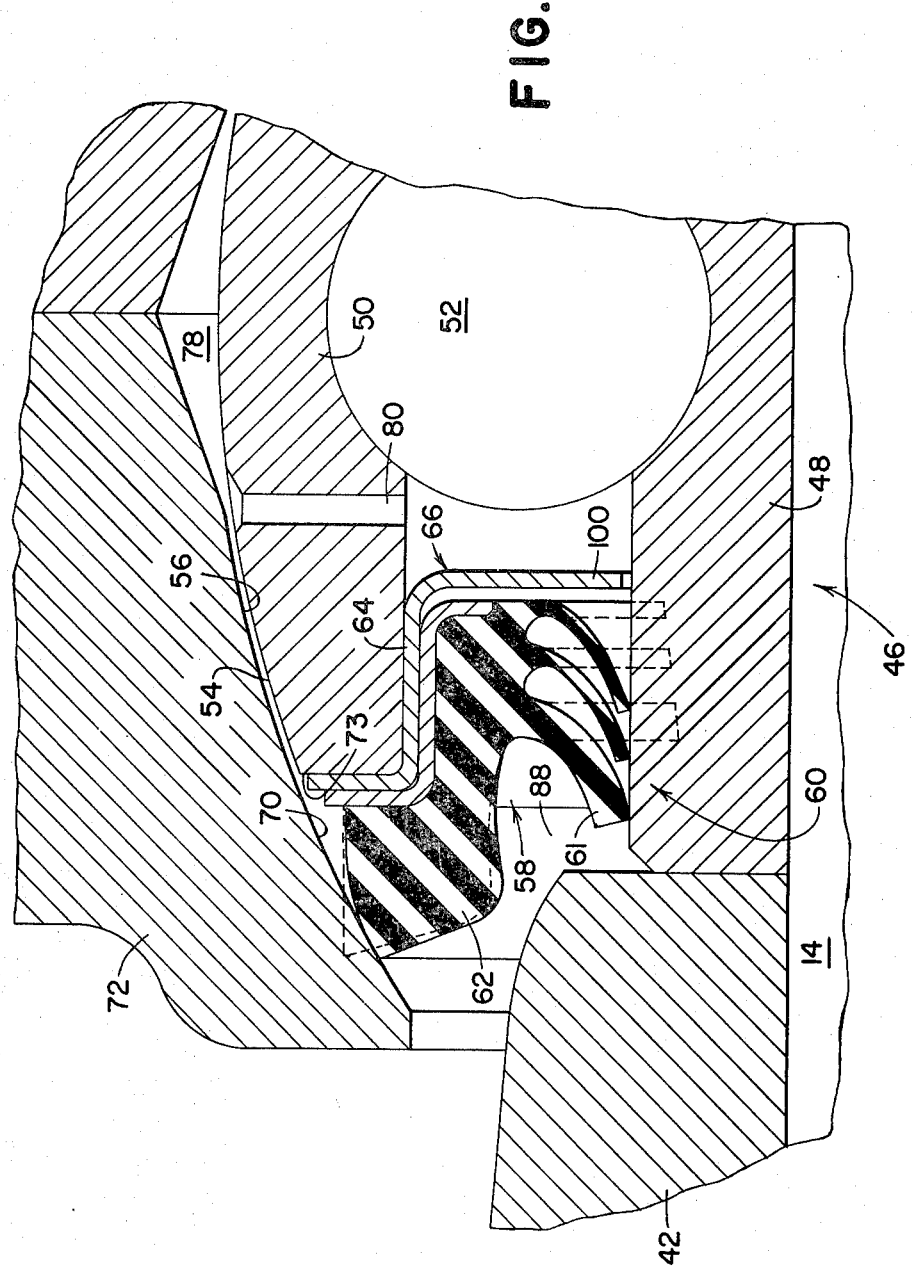
FIG. 9 illustrates an enlarged and cut away view of the preferred seal and bearing configuration.

FIG. 9 illustrates in greater detail the unique configuration of the seal 58 carried by the outer race ring 50. The resilient annular seal 58 includes first resilient lips 60 extending radially inwardly and a second resilient lip 62 extending outwardly. Both lips 60 and 62 are integrally formed and carried by the metal core 64 which is attached to an annular metal cup support 66 that is in turn carried by the outer race ring 50. The core 64 is comprised of a first radially extending portion carried at the axial outer face of the outer race ring 50 and a second axially extending portion that is carried at the inner surface of the outer race ring 50. These core portions respectively aid in supporting the second and first lips 62 and 60. The first lips 60 of the seal 58 extend radially inwardly and wipingly engage the outer circumferential surface 68 of the inner race ring 48 as it rotates with the shaft 14 during field working operations. The axial outermost lip 61 is preferably formed with a thicker cross section to increase the pressure it can exert against the inner race ring 48 and improve the seal against entry of contamination. The thicker lip 61 is also better able to exclude accumulations of dirt that may enter between the housing flange 72 and collar 42.

The second resilient lip or seal 62 is of a thicker cross section relative to the surfaces of the first lip 60 and engages the spherical inner surface 70 of the portion 72 of the flange 36, which extends axially beyond and overhangs the outer edge 73 of the outer race ring 50. The lip 62 is formed with a thick cross section so that it can exert substantial pressure on the spherical surface 70 and serve as a brake or drag to resist relative movement between the outer race ring 50 and housing 16 and also as a seal against contaminates entering between the ring 50 and housing 16. Lips 62, as well as lips 60, are formed as illustrated by the dotted lines of FIG. 9 and when assembled are deflected so that a better frictional engagement is realized. Also aiding to support the lip 62 is the radially extending portion of the core 64. The lip 62 further includes a broadened outer surface that increases the contact area between it and the surface 70. Since the lever arm from the center of the shaft to the contact area on the surface 70 through which the lip 62 acts is larger than the lever arm through which the seals 60 and 61 act, the drag of lip 62 is greater than that drag exerted by the lips 60-61. For these reasons, the lip 62 is able to yieldably resist creep (rotational movement) of the outer race ring 50 within the housing 16 and oscillation (axial or rocking movement) of the outer race ring 50 within the housing 16.

To aid in excluding contamination, the lip 62 is carried along the radially extending face or edge 73 of the outer race ring 50 while the first lips 60 project radially inwardly below the inner surface of the outer race ring 50. Since the lip 62 projects axially out over the lips 60, the area through which contaminates can enter is reduced. The lip 62 also serves to seal against entry of contiminants between the non-rotating housing 16 and outer surface 54 of the non-rotating outer race ring 50. Since very little rotational movement between these parts occurs, the lip 62 does not flex to wipe contaminates away or permit lubricant to escape from the reservoir 78 formed between the housing 16 and ring 50 to flush the contaminates away. However, due to its designed ability to exert significant pressure against the surface 70, it is able to serve as a seal as well.

Figure 5:
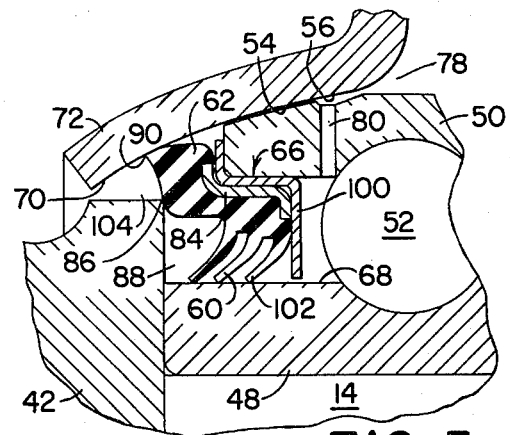
FIG. 5 is a view similar to FIG. 4 and illustrating another seal and core construction.

The embodiment illustrated in FIG. 3 as well as those alternative embodiments illustrated in FIGS. 4 and 5 include a separate metal core or stiffening means 64, with the embodiments illustrated in FIGS. 3 and 4 having radially extending perforations 74 therethrough. The perforations 74 permit the first and second seal lips 60 and 62 to be integrally formed of the same material and therefore to have an increased resiliency, strength and wear life.

Referring again to FIGS. 2 and 9, there is shown a means for introducing lubrication into the bearing. A lubrication fitting 76 is supported by the flange half 36. Formed between the flange halves 36 and 38 is a cavity 78 which extends between the loose fitting surfaces 54 and 56. Thus reservoir 78 is in communication with the lubrication fitting 76. Extending axially through the outer race ring are two small openings 80. Sealing this cavity or grease reservoir 78 against leakage as lubrication is introduced into the fitting 76 is a thin gasket 82 between the flange halves 36 and 38.

FIGS. 4 and 5 illustrate substantially similar seal configurations having alternate core members 64 and 84. The configuration illustrated in FIG. 5 is designed for resilient contact between the seal 62 and the outer periphery 86 of the adjacent spool 42 so as to retard entry of dirt into the area 88 which is adjacent the inwardly extending resilient lips 60. The core 64 illustrated in FIG. 4 is designed to provide additional support for the outer surface 90 of the lip 62 so as to assure better contact between it and the inner surface 70 of the flanges at portion 72.

Figure 6:
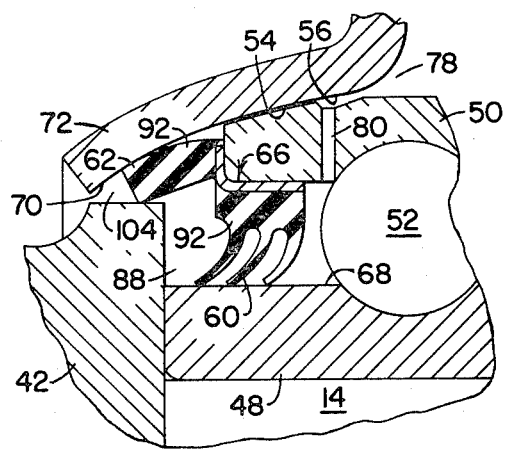
FIG. 6 illustrates yet another alternate seal construction having separate resilient seal lips.
Figure 7:
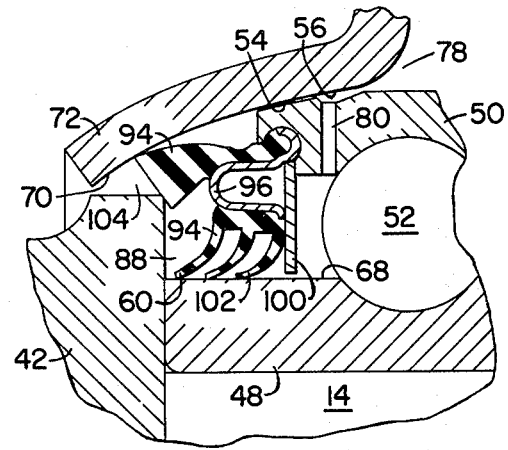
FIG. 7 illustrates another alternate seal construction and core structure for attaching the seal to the outer race ring.

FIGS. 6 and 7 illustrate separate seal lips 92 and 94 respectively joined to unitary cup supports 66 and 96 which permit separate seal materials to be utilized in the production of the seal lips 92 and 94.

Figure 8:
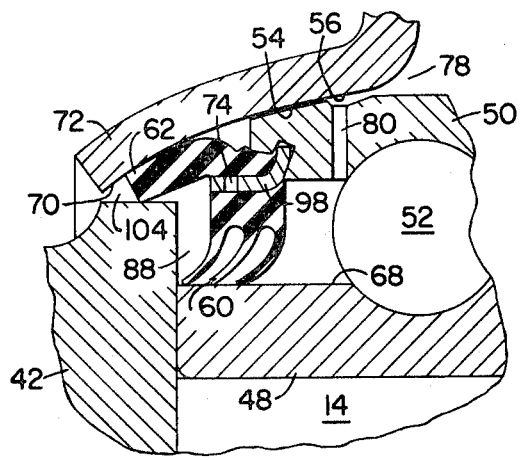
FIG. 8 illustrates a further modification of the seal construction and core structure for attaching it to the outer race ring.

FIGS. 7 and 8 provide alternate cup support configurations 96 and 98 which include a crimped surface attached to the outer bearing race ring 50. FIG. 8 provides an alternate embodiment wherein a single metal core member serves as the stiffening means as well as the cup support 98 for attaching the seal with the outer bearing race ring 50.

Illustrated in FIGS. 3, 4, 5, 7 and 9 are cup supports 66 having vertically extending wall portions 100 inwardly spaced from and adjacent to the innermost lip surface designated 102 of the inwardly extending wiper lips 60. This wall portion 100 is provided to assure that upon assembly of the outer race ring 50 and seal 58 upon the inner race ring 48, the inwardly extending wiper lips 60 do not roll over and project at their ends toward the ball bearing anti-friction means. Further, the wall portion 100 prevents the lips 60 from becoming inverted by external pressure from contaminates.

Typically, two or three bearing supports 16 will be utilized to carry the shaft 14 and its disk harrow blades 12. Due to the vertical and horizontal forces encountered by the blades 12 during operation and thus transferred to the bearing supports 16, the shaft 14 may not be precisely aligned within all of the bearing supports 16. The bearings 46 therefore must be self-aligning and capable of compensating for this initial misalignment, as well as for the dynamic misalignment which occurs during earthworking operations.

As the disk harrow is pulled through the field and the disk blades 12 rotate, both vertical and horizontal forces are transferred through the disk blades 12 to the shaft 14 and its supporting bearing structure. These forces are further transferred to the disk frame 10 by each of the bearing supports 16 thereby transmitting to adjacent bearing supports 16 fluctuating horizontal and vertical forces. Accordingly, the bearings which support the shaft 14 must be capable of accommodating some wobble with respect to the shaft, and oscillating movement of support 16 and flanges 36 and 38 with respect to the outer race ring 50. As wobble or oscillation occurs, the lip 62 yieldably presses against the surface 70 to resist the movement yet allows such movement so as to avoid failure of the bearings. To assure continued dynamic self-alignment, the grease reservoir 78 is provided to lubricate the surfaces 56 and 54 between the flanges 36 and 38 and the outer race ring 50.

As the disk blades 12, shaft 14 and inner race ring 48 rotate during field operations, water, dirt, sand and other contaminants will cover the support 16 and spacer spools 42 and 44. Looking again to FIGS. 2 and 9, it will be seen that the seal lip 62 presses against the surface 70 to prevent entry of these contaminants through the space between the inner surface 56 of the flange half 36 and the outer surface 54 of the outer race ring 50.

While not illustrated in the preferred embodiment of FIG. 9, a V-groove indentation 106 can also be provided in the periphery of the spool spacers 42 and 44 adjacent to the bearing support 16. This groove 106 permits wire and similar materials to wrap within it rather than slide into the opening or gap 104 between the flange 72 and spool peripheries adjacent to the bearing race rings.

While most of the illustrated wiper seal embodiments show the second lip surface 62 in contact with the outer periphery of a spool adjacent to the bearing inner race ring 48, such contact is not always desirable and is not shown in the preferred embodiment of FIG. 9. Such contact with the spool when it does occur should be of a very small magnitude so as to not interfere with the ability of the lip 62 to frictionally prevent movement of the outer race ring 50 relative to the housing 16. So long as the lip 62 continues to frictionally engage the inner surface 70 of the flange portion 72 and the inwardly extending seal lip 60 continues to engage the outer circumferential surface 68 of the inner race ring 48, the dirt and contamination that enter between the flange portion 70 and outer peripheries of the spools 42 and 44 will be wipingly pushed out the gap 88 and 104 as the shaft 14, spools 42 and 44 and inner race ring 48 rotate within the bearing support 16 and the seal lips 60 flex.

With this improved seal configuration the expected life of the seal, bearing surface and therefore the bearing support can be extended so as to minimize the lost time incurred for replacement activity during the operating season.

I claim:

1. An improved self-aligning bearing assembly of the type adapted to rotatably support a shaft comprising: an inner race ring rotatably coupled with the shaft; anti-friction bearing means spaced circumferentially around the inner race ring; an outer race ring rotatably carried on the bearing means; a housing member supporting the outer race ring, said member and outer race ring slidably abutting at complementary surfaces of spherical cross section, the housing member having a side flange extending axially outwardly beyond the side of the outer race ring; and an annular resilient seal member carried by the outer race ring including a first seal lip extending radially inwardly and slidably engaging the outer surface of the inner race ring and a second seal lip extending axially outwardly and wipingly engaging the side flange of said housing member.

2. The invention described in claim 1 wherein the first lip includes a main body having separate lip portions of lesser thickness than the second lip.

3. The invention described in claim 1 wherein the second lip includes a relatively rigid annular stiffening means.

4. An improved self-aligning bearing assembly of the type adapted to rotatably support a shaft comprising: an inner race ring rotatably coupled with the shaft; anti-friction bearing means spaced circumferentially around the inner race; an outer race ring rotatably carried on the bearing means; spacer members carried by the shaft and having portions abutting the sides of the inner race ring, said portions being generally cylindrical and having an external radius equal to or greater than the external radius of said inner race ring; a housing member supporting the outer race ring, said member and ring slidably engaged at complementary surfaces of spherical cross section, the housing member further having a side flange extending axially outwardly of the side of the outer race ring and inwardly so as to be adjacent said portion of the respective spacer member and form a narrow gap therewith; and a seal member carried by the outer race ring and having an axially inwardly extending first resilient seal lip slidably engaging the inner race ring and a second resilient seal lip extending axially outwardly and wipingly abutting the side flange and the portion of the spacer member and closing the gap therebetween.

5. The invention described in claim 4 wherein the first lip includes a main body having separate lip portions of lesser thickness than the second lip.

6. The invention described in claim 4 wherein the second lip includes a relatively rigid annular stiffening means.

7. The invention described in claim 4 wherein there is further formed in the housing member and between it and the outer race ring a reservoir, and the housing member carries means in communication with said reservoir whereby grease may be introduced into the reservoir.

8. An improved self-aligning bearing assembly of the type adapted to rotatably support a shaft comprising: anti-friction bearing means carried between an inner and outer race ring, the inner race ring rotatably coupled with the shaft; a housing member adapted to support the outer race ring, said member and ring having complementary surfaces of spherical cross section slidably engaged; the housing member further having side flanges extending inwardly and adjacent the sides of the outer race ring; and a seal having a metal stiffening member, means for connecting the stiffening member to the outer race ring; resilient seal lips carried by the stiffening member and slidably engaging the outer circumferential surfaces of the inner race ring; and a resilient wiper lip carried by the stiffening member and wipingly engaging the side flange.

9. An improved self-aligning bearing assembly of the type adapted to rotatably support a shaft comprising: inner and outer race rings, the former rotatably carried on the shaft and the latter rotatably carried on anti-friction means supported on the former; a housing member adapted to support the outer race ring, said housing member and outer race ring having complementary surfaces of spherical cross section slidably engaged, said housing further having side flanges extending inwardly and adjacent the sides of the outer race ring; a reservoir formed between the housing member and the outer race ring; means carried by the housing member in communication with said reservoir whereby lubricating may be introduced; and a seal member carried by the outer race ring and including first resilient seal lips extending radially inwardly and slidably engaging the outer circumference of the inner race ring and second seal lips extending radially outwardly and wipingly engaging the side flange of the housing member so as to maintain lubricating within the reservoir and prevent entry of contaminates thereinto.

10. A bearing assembly for an associated support having an inner bearing-receiving surface formed as the section of a sphere, comprising: an outer race ring received by the bearing-receiving surface and having an outer surface formed as a section of a sphere and having a substantially common center with the bearing-receiving surface to permit oscillation of the outer race ring relative to the support; an inner race ring and a plurality of anti-friction elements; and an annular seal fixed to the outer race ring including a first annular resilient lip extending radially inwardly and wipingly engaging the outer circumferential surface of the inner race ring and a second annular resilient lip extending toward and frictionally engaging the inner bearing-receiving surface of said support so as to resist rotation of the outer race ring relative to the support.

11. The invention described in claim 10 wherein the first lip includes a main body having separate lip portions of lesser thickness than the second lip, with the axially outermost lip portion being of greater thickness than the other lip portion.

12. The invention described in claim 10 wherein the second lip is supported by a radially extending and relatively rigid annular stiffening means carried by the outer race ring.

13. The invention described in claim 10 wherein the annular seal member is attached to an annular cup support carried by the outer race ring.

14. The invention described in claim 13 wherein the cup support is attached to the outer race ring by a crimped surface.

15. The invention described in claim 10 wherein the first lip of the seal member has a main body having separate lip portions of lesser thickness than the second lip and the second lip is supported by a radially extending relatively rigid annular stiffening means.

16. The invention described in claim 10 wherein the second lip includes a portion extending radially outwardly alongside the outer race ring.

17. The invention described in claim 10 wherein the inner race ring is carried between and confined by axially spaced collars, with one collar being of greater diameter than the inner race ring, and a portion of the outer periphery of said one collar is closely spaced to and overhung by the inner bearing-receiving surface and wherein the second lip wipingly engages the outer periphery of said one collar.

18. The invention described in claim 10 wherein there is further formed in the support and between it and the outer race ring a reservoir, and the support carries means in communication with said reservoir whereby grease may be introduced into the reservoir.

19. A shaft supporting structure including a support surrounding the shaft with an inner bearing-receiving spherical surface formed about a center substantially on the axis of the shaft, and a bearing assembly comprising: an outer race ring exteriorly formed to complement and to oscillate within the bearing-receiving surface; an inner race ring rotatable with the shaft; a plurality of anti-friction elements between said rings; an annular seal member fixed to the outer race ring and having a first annular resilient lip extending radially inwardly and wipingly engaging the outer circumferential surface of the inner race ring; and a second annular resilient lip extending toward and frictionally engaging the inner bearing-receiving surface so as to resist relative rotation between said outer race ring and support structure.

20. The invention described in claim 19 wherein the first lip includes a main body having separate lip portions of lesser thickness than the second lip, with the axially outermost lip portion being of greater thickness than the other lip portion.

21. The invention described in claim 19 wherein the second lip is supported by a radially extending and relatively rigid annular stiffening means carried by the outer race ring.

22. A bearing assembly for an associated support having an inner bearing-receiving surface formed as the section of a sphere, comprising: an outer race ring having an outer surface formed as a section of a sphere and having a substantially common center with the bearing-receiving surface, the outer surface of the outer race ring having a radius less than the radius of the bearing-receiving surface; an inner race ring and a plurality of anti-friction elements; and an annular seal fixed to the outer race ring with a first annular resilient lip extending radially inwardly and engaging the outer circumferential surface of the inner race ring and a second annular resilient lip extending toward and frictionally engaging the inner bearing-receiving surface so as to yieldably restrain rotation of the outer race ring relative to the support.

23. The invention described in claim 22 wherein the first lip includes a main body having separate lip portions of lesser thickness than the second lip, with the axially outermost lip portion being of greater thickness than the other lip portion.

24. The invention described in claim 22 wherein the second lip is supported by a radially extending and relatively rigid annular stiffening means carried by the outer race ring.

25. The invention described in claim 22 wherein the second lip includes a portion extending radially outwardly alongside the outer race ring.

26. A bearing assembly adapted to rotatably support a shaft comprising: an inner race ring rotatably coupled with the shaft; anti-friction bearing means spaced circumferentially around the inner race ring; an outer race ring rotatably carried on the bearing means and having an outer surface formed as the section of a sphere; a housing including an inner bearing-receiving spherical surface slidably supporting the outer race ring, the housing member further having a side flange extending axially outwardly beyond the radially extending side of the outer race ring; and an annular resilient seal member carried by the outer race ring including a first seal lip extending radially inwardly and wipingly engaging the outer surface of the inner race ring and a second seal lip extending outwardly and frictionally engaging the side flange of said housing so as to yieldably resist rotational movement of the outer race ring relative to the housing.

27. The invention described in claim 26 wherein the first lip includes a main body having separate lip portions of lesser thickness than the second lip, with the axially outermost lip portion being of greater thickness than the other lip portion.

28. The invention described in claim 26 wherein the second lip is supported by a radially extending and relatively rigid annular stiffening means carried by the outer race ring.

29. The invention described in claim 26 wherein the second lip includes a portion extending radially outwardly alongside the outer race ring.

30. The invention described in claim 26 wherein there is further formed in the housing and between it and the outer race ring a reservoir, and the housing carries means in communication with said reservoir whereby grease may be introduced into the reservoir.

31. The invention described in claim 26 wherein the inner race ring is carried between and confined by axially spaced collars, with one collar being of greater diameter than the inner race ring, and a portion of the outer periphery of said one collar being closely spaced from and overhung by the side flange and wherein the second lip wipingly engages the outer periphery of said one collar.

32. A self-aligning bearing assembly adapted to rotatably support a shaft comprising: an inner race ring rotatably coupled with the shaft; anti-friction bearing means spaced circumferentially around the inner race ring; an outer race ring rotatably carried on the bearing means and having an outer surface formed as the section of a sphere with radially extending faces spaced axially inwardly of the radially extending faces of said inner race ring; a housing member including an inner bearing-receiving surface formed as the section of a sphere and slidably supporting the outer race ring, said member having side flanges extending axially outwardly beyond the radially extending faces of the outer race ring; and an annular resilient seal member carried at each radially extending face of the outer race ring; each seal member including a first seal lip extending radially inwardly and wipingly engaging the outer surface of the inner race ring and an annular resilient seal lip extending axially outwardly and frictionally engaging a respective side flange of said housing member so as to resist rotation of said outer race ring relative to said housing member.

33. The invention described in claim 32 wherein the first lip includes a main body having separate lip portions of lesser thickness than the second lip, with the axially outermost lip portion being of greater thickness than the other lip portion.

34. The invention described in claim 32 wherein the second lip is supported by a radially extending and relatively rigid annular stiffening means carried by the outer race ring.

35. The invention described in claim 32 wherein the second lip includes a portion extending radially outwardly alongside the outer race ring.

* * * * *